United States Patent
Ma et al.

(10) Patent No.: US 10,110,404 B2
(45) Date of Patent: Oct. 23, 2018

(54) PHASE CALIBRATION METHOD AND APPARATUS

(71) Applicant: Huawei Technologies Co., Ltd., Shenzhen, Guangdong (CN)

(72) Inventors: Jun Ma, Chengdu (CN); Yanxing Luo, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/598,737

(22) Filed: May 18, 2017

(65) Prior Publication Data

US 2017/0257240 A1    Sep. 7, 2017

Related U.S. Application Data

(63) Continuation of application No. PCT/CN2014/091673, filed on Nov. 19, 2014.

(51) Int. Cl.
| | | |
|---|---|---|
| *H04L 27/12* | (2006.01) | |
| *H04L 27/20* | (2006.01) | |
| *H01Q 3/30* | (2006.01) | |
| *H04L 27/14* | (2006.01) | |
| *H04L 5/00* | (2006.01) | |
| *H04B 17/12* | (2015.01) | |

(52) U.S. Cl.
CPC ............... *H04L 27/20* (2013.01); *H01Q 3/30* (2013.01); *H04B 17/12* (2015.01); *H04L 5/0048* (2013.01); *H04L 27/14* (2013.01)

(58) Field of Classification Search
CPC ... H04L 27/20; H04L 27/0008; H04L 5/0048; H03F 1/0288; H03F 3/19; H03F 3/211

USPC ..... 375/302, 371; 327/234, 292; 342/357.12
See application file for complete search history.

(56) References Cited

U.S. PATENT DOCUMENTS

| | | | |
|---|---|---|---|
| 2009/0298453 A1 | 12/2009 | Elenes | |
| 2010/0039157 A1* | 2/2010 | Kaeriyama | ............... G06F 1/08 327/292 |
| 2011/0043266 A1* | 2/2011 | Wan | ....................... H03H 11/16 327/234 |
| 2017/0126181 A1* | 5/2017 | Embar | .................. H03F 1/0288 |

FOREIGN PATENT DOCUMENTS

| | | |
|---|---|---|
| CN | 102280719 A | 12/2011 |
| CN | 102426300 A | 4/2012 |
| CN | 102610920 A | 7/2012 |
| EP | 1583174 A2 | 10/2005 |

* cited by examiner

*Primary Examiner* — Khai Tran

(57) ABSTRACT

Embodiments of the present disclosure provide a phase calibration method and apparatus, where the apparatus includes a first phase detector and a phase shift control device connected to the first phase detector. The first phase detector is configured to obtain N first signals, compare the N first signals with a reference signal, so as to obtain a phase difference between the reference signal and each first signal in the N first signals, and output the phase difference to the phase shift control device, where N is not less than 2, the N first signals are signals respectively phase-shifted by N phase shifters, and a carrier frequency of the reference signal is the same as a carrier frequency of the N first signals. The phase shift control device is configured to adjust phase shift of the N phase shifters on a one-to-one basis according to the N phase differences.

21 Claims, 15 Drawing Sheets

PHASE CALIBRATION METHOD AND APPARATUS

CROSS-REFERENCE TO RELATED APPLICATIONS

This application is a continuation of International Application No. PCT/CN2014/091673, filed on Nov. 19, 2014, the disclosure of which is hereby incorporated by reference in its entirety.

TECHNICAL FIELD

Embodiments of the present application relate to the field of communications technologies, and in particular, to a phase calibration method and apparatus.

BACKGROUND

In a microwave phased array system, there are multiple radio frequency channels (for example, transmit/receive channels). Each radio frequency channel has a corresponding antenna. There are one or more phase shifters on each radio frequency channel. After a specific phase is set for each phase shifter, a phase shift operation may be performed on a radio frequency signal, so as to implement beamforming. However, an effect of beamforming heavily depends on consistency of phases of the multiple radio frequency channels. For example, when a phase shift of a phase shifter is configured as 0, it is required that phase differences among signals transmitted by multiple antennas are 0. However, time delays for the signal passing through frequency mixers on all radio frequency channels are different, time delays for the signal passing through filters are different, and so on, and the phase differences among the signals transmitted by the multiple antennas are not 0. Therefore, initial phase calibration needs to be performed on each radio frequency channel.

In the prior art, as shown in FIG. 1, a transmit channel A transmits signals on multiple channels, and a receive channel B receives signals on a single channel. A digital part A generates a baseband signal, and sends the baseband signal to the transmit channel A. After converted by a digital to analog converter (DAC), the digital baseband signal becomes an analog baseband signal, and then the analog baseband signal is split into four analog baseband signals by a power splitter. After separately mixed, filtered, phase-shifted, and amplified, the four analog baseband signals are transmitted by antennas. After an antenna of the receive channel B receives signals transmitted by the transmit channel A, amplification, filtering, phase shift, and frequency mixing operations are performed on the signals, and the receive channel B obtains the received baseband signals. After sampling is performed by an analog to digital converter (ADC) on the baseband signals, the baseband signals are processed by a digital part B. The digital part B extracts an available signal, and feeds back the available signal to the digital part A by using a feedback channel. The digital part A generates initial phase calibration values of phase shifters on the multiple channels according to the fed-back signal, thereby implementing initial phase calibration of four radio frequency channels shown in FIG. 1.

However, in the prior art, the signals transmitted by the antennas of the transmit channel A can arrive at the digital part B only through the receive channel B, which causes low accuracy of the generated initial phase calibration values due to impact of channel interference.

SUMMARY

Embodiments of the present disclosure provide a phase calibration method and apparatus, so as to improve accuracy of an initial phase calibration value of each phase shifter.

According to a first aspect, an embodiment of the present disclosure provides a phase calibration apparatus, including: a first phase detector and a phase shift control device connected to the first phase detector; where the first phase detector is configured to obtain N first signals, compare the N first signals with a reference signal, so as to obtain a phase difference between the reference signal and each first signal in the N first signals, and output the phase difference to the phase shift control device, where N is an integer greater than or equal to 2, the N first signals are signals respectively phase-shifted by N phase shifters, and a carrier frequency of the reference signal is the same as a carrier frequency of the N first signals; and the phase shift control device is configured to adjust phase shift of the N phase shifters on a one-to-one basis according to the N phase differences.

According to a second aspect, an embodiment of the present disclosure provides a phase calibration method, including: obtaining N first signals, where the N first signals are signals respectively phase-shifted by N phase shifters, and N is an integer greater than or equal to 2; comparing the N first signals with a reference signal, so as to obtain a phase difference between the reference signal and each first signal in the N first signals, where a carrier frequency of the reference signal is the same as a carrier frequency of the N first signals; and adjusting phase shift of the N phase shifters on a one-to-one basis according to the obtained N phase differences.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
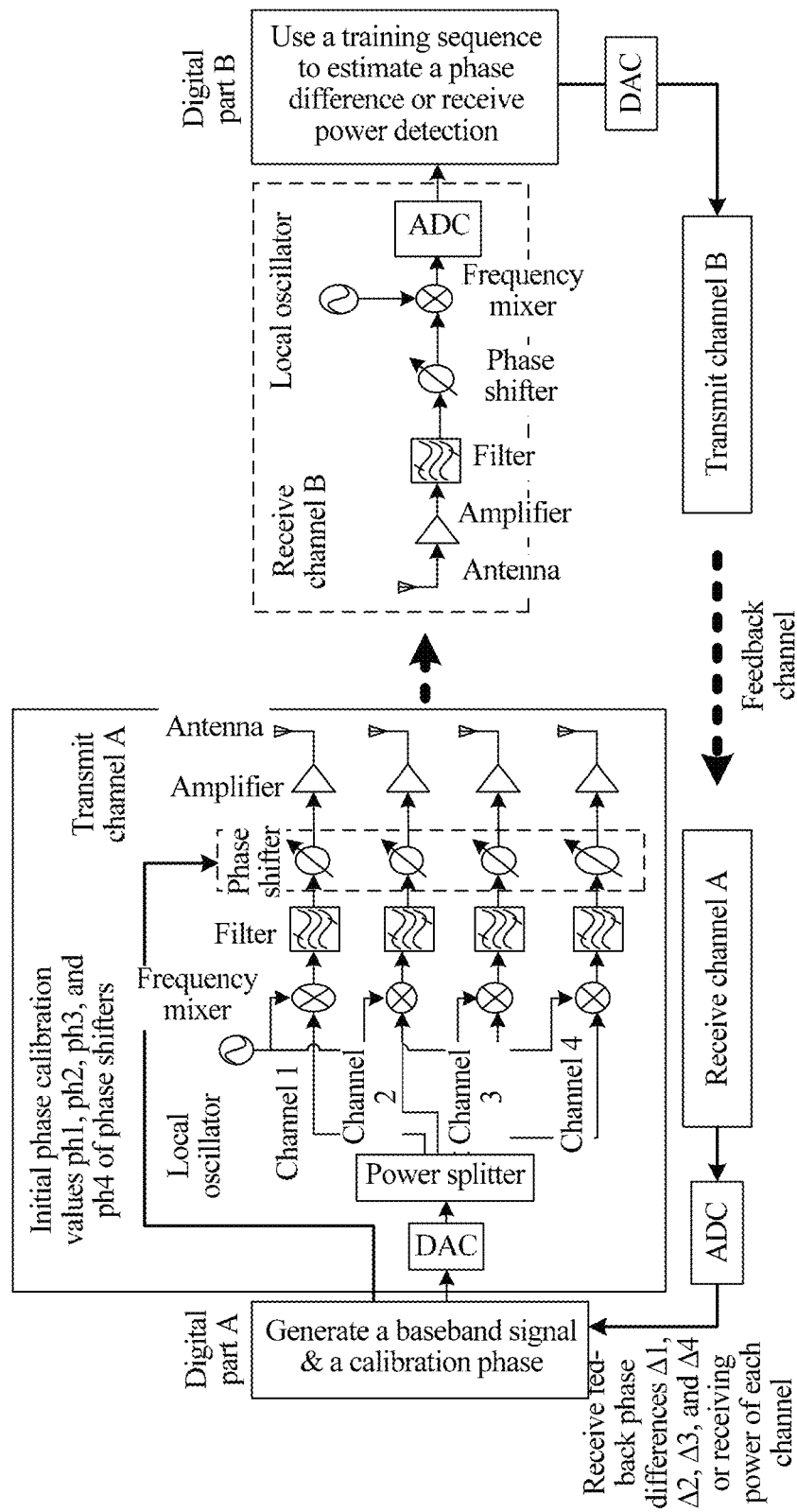
FIG. 1 is a schematic diagram of phase calibration according to the prior art.
Figure 2:
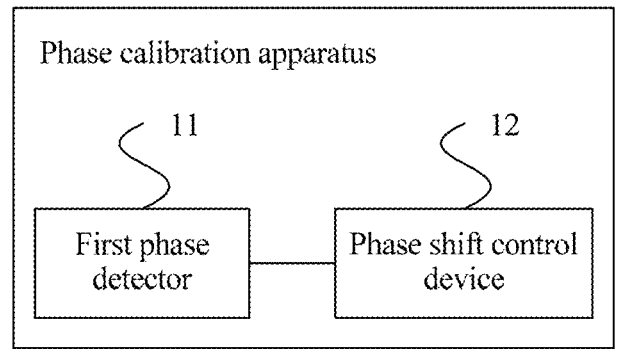
FIG. 2 is a schematic structural diagram of Embodiment 1 of a phase calibration apparatus according to the present disclosure.

FIG. 2 is a schematic structural diagram of Embodiment 1 of a phase calibration apparatus according to the present disclosure. As shown in FIG. 2, the phase calibration apparatus in this embodiment includes a first phase detector 11 and a phase shift control device 12. The phase shift control device 12 is connected to the first phase detector 11. The first phase detector 11 is configured to obtain N first signals, compare the N first signals with a reference signal, so as to obtain a phase difference between the reference signal and each first signal in the N first signals, and output the phase difference to the phase shift control device 12, where N is an integer greater than or equal to 2. The N first signals are signals respectively phase-shifted by N phase shifters, and a carrier frequency of the reference signal is the same as a carrier frequency of the N first signals. The phase shift control device 12 is configured to adjust phase shift of the N phase shifters on a one-to-one basis according to the N phase differences.

Figure 3:
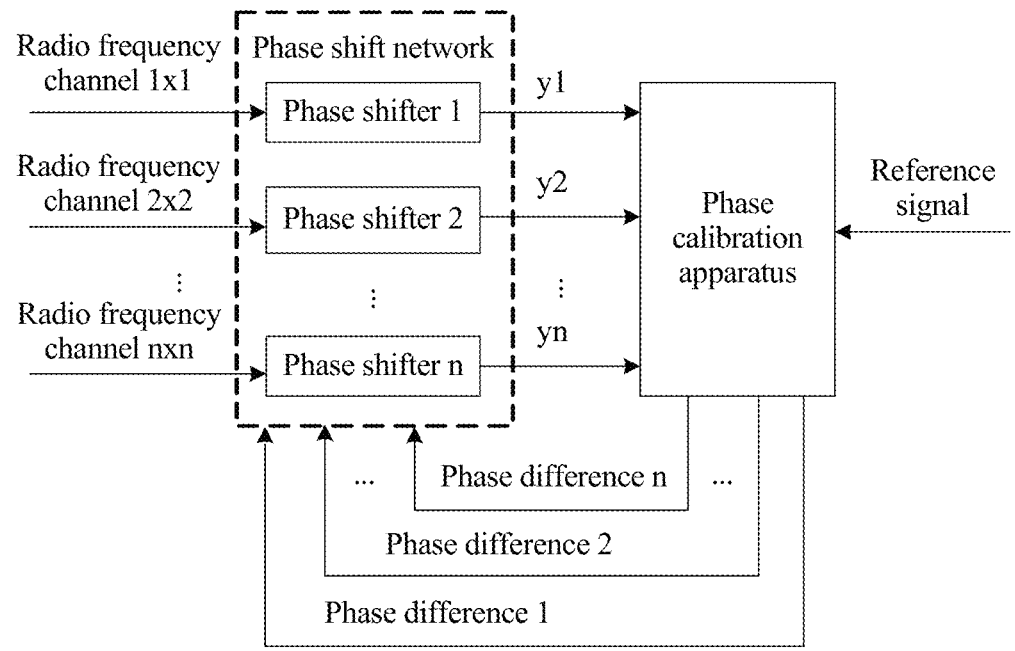
FIG. 3 is an application scenario diagram of the phase calibration apparatus that is configured to calibrate a phase and that is shown in FIG. 2.

In this embodiment, when a phase shift network on a radio frequency channel includes N phase shifters, as shown in FIG. 3, that is, a phase shifter 1, a phase shifter 2, ..., and a phase shifter n, the first phase detector 11 obtains signals that are phase-shifted by the N phase shifters and that are corresponding to signals x1, x2, ..., and xn on a one-to-one basis on the radio frequency channel. The signals phase-shifted by the phase shifters are referred to as first signals, that is, the N first signals are respectively y1, y2, ..., and yn. Therefore, the first phase detector 11 may obtain the N first signals (y1, y2, ..., and yn), then separately compare the N first signals with the reference signal, that is, compare a phase of the reference signal with a phase of each first signal, and may obtain a phase difference between the phase of the reference signal and the phase of each first signal (that is, the phase of each first signal is separately subtracted from the phase of the reference signal, and obtained N values are used as the N phase differences), and the N phase differences are a phase difference 1, a phase difference 2, ..., and a phase difference n, and output the N phase differences to the phase shift control device 12. The phase shift control device 12 adjusts the phase shift of the N phase shifters on a one-to-one basis according to the N phase differences, that is, adjusts the N phase shifters and increases corresponding phase differences. Specifically, the phase shift control device 12 adjusts a phase shift of the phase shifter 1 according to the phase difference 1, adjusts a phase shift of the phase shifter 2 according to the phase difference 2, ..., and adjusts a phase shift of the phase shifter n according to the phase difference n. It should be noted that the N operating processes may be concurrently executed.

For example, the phase shifter 1 in the N phase shifters is used as an example. The first phase detector 11 obtains the first signal y1 phase-shifted by the phase shifter 1. In this case, the phase shift of the phase shifter 1 is, for example, $\pi/2$, then the first signal is compared with the reference signal, so as to obtain the phase difference 1 (for example, $\pi/4$) between the phase of the reference signal and the phase of the first signal, and the phase difference 1 is output to the phase shift control device 12. The phase shift control device adjusts the phase shift of the first phase shifter according to the phase difference 1. An adjusted phase shift of the phase shifter 1 is, for example, $(\pi/2+\pi/4)$. The other phase shifters in the N phase shifters are all similarly calibrated in the foregoing manner, which is not described herein, so that the N phase shifters perform phase shifts on the signals according to adjusted phase shift, and therefore, phases of the N first signals respectively phase-shifted by the N phase shifters are the same, and are the same as the phase of the reference signal.

According to the phase calibration apparatus provided in this embodiment of the present disclosure, a first phase detector 11 obtains N first signals, compares the N first signals with a reference signal, so as to obtain a phase difference between the reference signal and each first signal in the N first signals, and outputs the phase difference to a phase shift control device 12, where N is an integer greater than or equal to 2, the N first signals are signals respectively phase-shifted by N phase shifters, and a carrier frequency of the reference signal is the same as a carrier frequency of the N first signals. The phase shift control device 12 adjusts phase shift of the N phase shifters on a one-to-one basis according to the N phase differences. Because a calibration phase of each phase shifter is obtained by locking all phases of the N first signals phase-shifted by the N phase shifters into a phase of the reference signal, accuracy of an obtained initial phase calibration value of each phase shifter is improved without requiring a feedback channel or being affected by channel interference.

Figure 4:
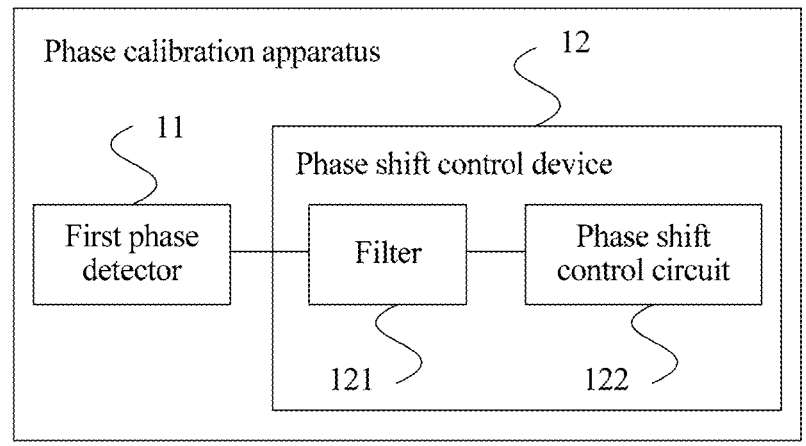
FIG. 4 is a schematic structural diagram of Embodiment 2 of a phase calibration apparatus according to the present disclosure.

FIG. 4 is a schematic structural diagram of Embodiment 2 of a phase calibration apparatus according to the present disclosure. As shown in FIG. 4, the phase calibration apparatus in this embodiment is based on a structure of the apparatus shown in FIG. 2. Further, the foregoing phase shift control device 12 may include a filter 121 and a phase shift control circuit 122. The filter 121 is separately connected to the first phase detector 11 and the phase shift control circuit 122. The phase shift control circuit 122 may be connected to the N phase shifters. The filter 121 is configured to perform smooth filtering processing on the phase difference between each first signal in the N first signals and the reference signal, so as to obtain N phase differences on which the filtering processing is performed, and output the N phase differences on which the filtering processing is performed to the phase shift control circuit 122. The phase shift control circuit 122 is configured to adjust the phase shift of the N phase shifters on a one-to-one basis according to the N phase differences on which the filtering processing is performed and that are output by the filter 121. Because the N phase differences obtained by the first phase detector 11 may be respectively continuously changing values, to obtain N specific values, the first phase detector 11 outputs the obtained N phase differences to the filter 121. The filter 121 performs the smooth filtering processing on the N phase differences input by the first phase detector 11, so as to obtain the N phase differences on which the filtering processing is performed, that is, the N specific values, and outputs the N phase differences on which the filtering processing is performed to the phase shift control circuit 122. The phase shift control circuit 122 adjusts a phase shift of the first phase shifter in the N phase shifters according to the first phase difference in the N phase differences on which the filtering processing is performed and that are output by the filter, . . . , and adjusts a phase shift of the $N^{th}$ phase shifter in the N phase shifters according to the $N^{th}$ phase difference in the N phase differences on which the filtering processing is performed and that are output by the filter.

Optionally, the phase shift control circuit 122 is further configured to store a correspondence between a phase difference and a phase shifter configuration parameter. That the phase shift control circuit 122 is configured to adjust the phase shift of the N phase shifters on a one-to-one basis according to the N phase differences on which the filtering processing is performed and that are output by the filter 121 includes: the phase shift control circuit 122 is specifically configured to determine, according to the N phase differences and the correspondence between the phase difference and the phase shifter configuration parameter, N phase shifter configuration parameters corresponding to the N phase differences on a one-to-one basis, and output the N phase shifter configuration parameters to the N phase shifters on a one-to-one basis, so that the N phase shifters perform phase shift configuration according to the N phase shifter configuration parameters. Specifically, the phase shift control circuit 122 determines, according to the first phase difference in the N phase differences on which the filtering processing is performed and that are input by the filter 121, and the correspondence between the phase difference and the phase shifter configuration parameter, a phase shifter configuration parameter corresponding to the first phase difference, and outputs the phase shifter configuration parameter to the first phase shifter, so that the first phase shifter performs phase shift configuration according to the phase shifter configuration parameter; . . . ; the phase shift control circuit 122 determines, according to the $N^{th}$ phase difference in the N phase differences on which the filtering processing is performed and that are input by the filter 121, and the correspondence between the phase difference and the phase shifter configuration parameter, a phase shifter configuration parameter corresponding to the $N^{th}$ phase difference, and outputs the phase shifter configuration parameter to the $N^{th}$ phase shifter, so that the $N^{th}$ phase shifter performs phase shift configuration according to the phase shifter configuration parameter.

In this embodiment, because a calibration phase of each phase shifter is obtained by locking all phases of N first signals phase-shifted by N phase shifters into a phase of a reference signal, accuracy of an obtained initial phase calibration value of each phase shifter is improved without requiring a feedback channel or being affected by channel interference.

In Embodiment 3 of a phase calibration apparatus according to the present disclosure, this embodiment is based on Embodiment 1 or Embodiment 2 of the phase calibration apparatus according to the present disclosure. The first phase detector 11 is further configured to obtain a second signal, and use the second signal as the reference signal.

Figure 5:
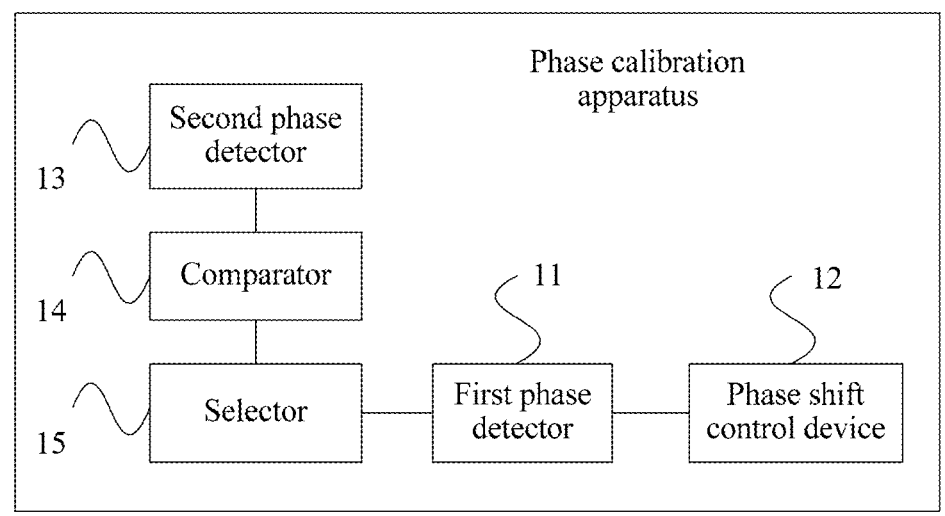
FIG. 5 is a schematic structural diagram of Embodiment 4 of a phase calibration apparatus according to the present disclosure.

FIG. 5 is a schematic structural diagram of Embodiment 4 of a phase calibration apparatus according to the present disclosure. As shown in FIG. 5, based on a structure of the apparatus shown in FIG. 2 or FIG. 4, the phase calibration apparatus in this embodiment may further include a second phase detector 13, a comparator 14, and a selector 15. The comparator 14 is connected to the second phase detector 13 and the selector 15. The selector 15 is connected to the first phase detector 11. The second phase detector 13 is configured to obtain M second signals, where M is an integer greater than or equal to 2, and all the second signals have different phases; separately compare the M second signals with a first signal in the N first signals, so as to obtain a phase difference between the first signal and each second signal in the M second signals, and output the phase difference to the comparator. The comparator 14 is configured to determine a second signal used to obtain a phase difference whose absolute value is smallest in the M phase differences, and output a result of the determining to the selector 15. The selector 15 is configured to obtain the M second signals, use, according to the result of the determining, the second signal determined by the comparator 14 as the reference signal, and output the second signal to the first phase detector 11.

Figure 6:
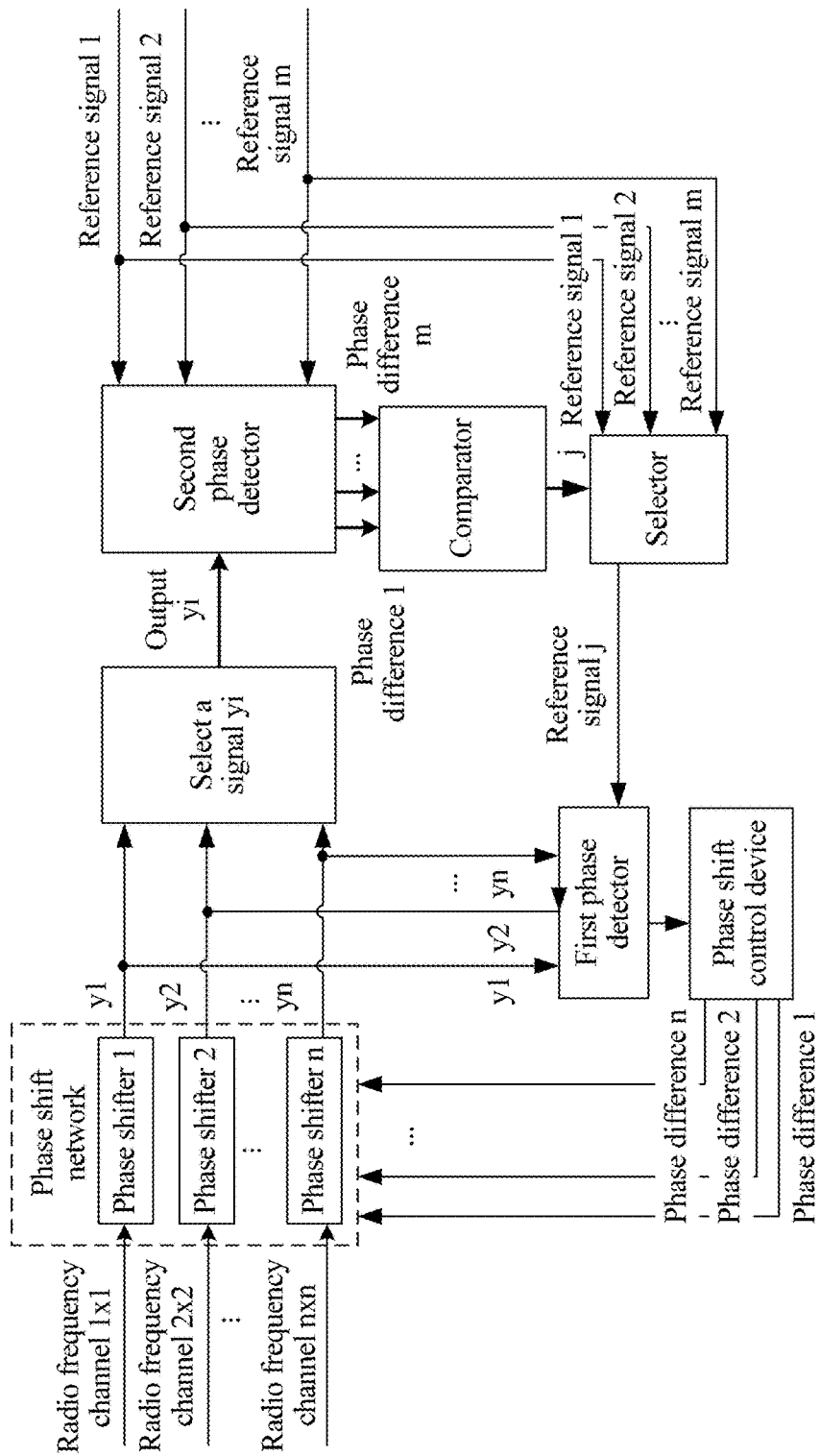
FIG. 6 is an application scenario diagram of the phase calibration apparatus that is configured to calibrate a phase and that is shown in FIG. 5.

In this embodiment, when a phase shift network on a radio frequency channel includes N phase shifters, as shown in FIG. 6, there are N phase-shifted signals (that is, the first signals), which are respectively signals y1, y2, . . . , and yn. A first signal is randomly selected from y1, y2, . . . , and yn, and is output to the second phase detector, for example, the signal yi is output to the second phase detector. In addition, the M second signals are output to the second phase detector and the selector, and the M second signals are respectively a reference signal 1, a reference signal 2, . . . , and a reference signal m. That is, the second phase detector obtains the reference signal 1, the reference signal 2, . . . , and the reference signal m, and the signal yi. Then the second phase detector separately compares a phase of the reference signal 1, a phase of the reference signal 2, . . . , and a phase of the reference signal m with a phase of the signal yi, and may obtain a phase difference between the reference signal 1 and the signal yi, a phase difference between the reference signal 2 and the signal yi, . . . , and a phase difference between the reference signal m and the signal yi, that is, the M phase differences, where the M phase differences are respectively a phase difference 1, a phase difference 2, . . . , and a phase difference m, and the second phase detector outputs the M phase differences to the comparator. Because a negative value may exist among the M phase differences, to better compare a phase difference between each reference signal and the signal yi, the comparator may compare absolute values of the M phase differences, and determine a smallest value from the absolute values of the M phase differences. For example, an absolute value of the phase difference j is smallest, and then the comparator outputs, to the selector, a result indicating that the absolute value of the phase difference j is smallest. The selector may output the reference signal j in the reference signal 1, the reference signal 2, . . . , and the reference signal m that is used to obtain the phase difference j to the first phase detector. In specific implementation, the reference signal 1, the reference signal 2, . . . , and the reference signal m may be numbered, which are respectively 1, 2, . . . , and m. Correspondingly, the phase differences between all reference signals and the signal yi are also numbered, which are respectively 1, 2, . . . , and m. When the comparator determines that the absolute value of the phase difference j is smallest, the comparator may determine that the number of the phase difference is j, and output the number j to the selector. The selector selects the reference signal whose number is j from all the reference signals, and outputs the reference signal whose number is j to the first phase detector.

In this embodiment, a second signal having a smallest phase difference from a first signal in N first signals is used as a reference signal. In this way, calibration of an initial phase of each radio frequency channel can be implemented more rapidly.

In a feasible implementation manner of the foregoing embodiments of the phase calibration apparatus according to the present disclosure, when the N phase shifters are phase shifters on a radio frequency transmit channel, signals output by the N phase shifters are finally transmitted by N antennas corresponding to the N phase shifters on a one-to-one basis. Therefore, the foregoing first signals may be signals that are phase-shifted by the phase shifters and that are prior to being transmitted by the antennas connected to the phase shifters on the radio frequency transmit channel, that is, the first signals are signals obtained between the phase shifters and the antennas. Optionally, the first signals are input signals of the antennas, that is, the N first signals are respectively an input signal of the first antenna, an input signal of the second signal, . . . , and an input signal of the $N^{th}$ antenna. Because the obtained first signals are the input signals of the antennas, a phase-affecting factor between the phase shifters and the antennas is considered, so that the obtained phase differences are more accurate. Therefore, after phases of the phase shifters are adjusted, a phase of a signal transmitted by each antenna may remain consistent.

Optionally, the second signals are signals that are mixed by a frequency mixer on the radio frequency transmit channel and that are prior to being transmitted by a first antenna on the radio frequency transmit channel; or the second signals are output signals of a local oscillator on the radio frequency transmit channel. The first antenna is any one of the N antennas connected to the N phase shifters on a one-to-one basis on the radio frequency transmit channel.

In another feasible implementation manner of the foregoing embodiments of the phase calibration apparatus according to the present disclosure, when the N phase shifters are phase shifters on a radio frequency receive channel, signals output by the N phase shifters arrive at a combiner, and are combined into one signal by the combiner. Therefore, the foregoing first signals may be signals that are phase-shifted by the phase shifters and that are prior to being combined by the combiner on the radio frequency receive channel. Optionally, the N first signals are N input signals of the combiner, that is, the N first signals are respectively a first input signal, a second input signal, . . . and an $N^{th}$ input signal that are of the combiner. Because the obtained first signals are the input signals of the combiner, a phase-affecting factor between the phase shifters and the combiner is considered, so that the obtained phase differences are more accurate. Therefore, after phases of the phase shifters are adjusted, a phase of each signal input to the combiner may remain consistent.

Optionally, the second signals are signals that are received by a second antenna on the radio frequency receive channel, that are filtered by a first level filter connected to the second antenna, and that are prior to being mixed by a frequency mixer on the radio frequency receive channel; or the second signals are output signals of a local oscillator on the radio frequency receive channel. The second antenna is any one of N antennas connected to the N phase shifters on a one-to-one basis on the radio frequency receive channel.

Figure 7:
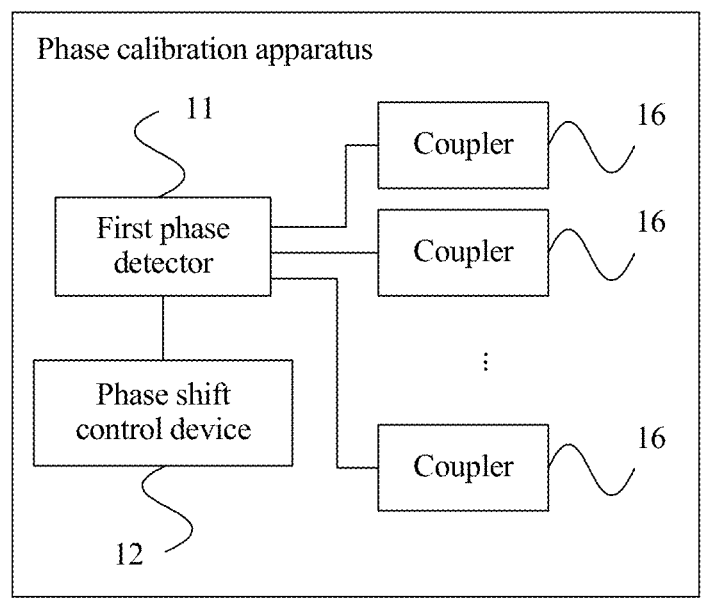
FIG. 7 is a schematic structural diagram of Embodiment 5 of a phase calibration apparatus according to the present disclosure.

FIG. 7 is a schematic structural diagram of Embodiment 5 of a phase calibration apparatus according to the present disclosure. As shown in FIG. 7, based on the foregoing embodiments of the phase calibration apparatus according to the present disclosure, the phase calibration apparatus in this embodiment may further include N couplers 16. The N couplers 16 are separately connected to the first phase detector 11. It should be noted that FIG. 7 shows the phase calibration apparatus based on a structure of the apparatus shown in FIG. 2, but this embodiment of the present disclosure is not limited thereto.

In a feasible implementation manner, when the phase calibration apparatus in this embodiment is configured to calibrate the N phase shifters on the radio frequency transmit channel, the N couplers 16 are N first couplers. The N couplers 16 are disposed between the N phase shifters and the N antennas on the radio frequency transmit channel on a one-to-one basis. The couplers 16 are configured to couple the signals that are phase-shifted by the phase shifters and that are prior to being transmitted by the antennas, use obtained coupled signals as the first signals, and output the obtained coupled signals to the first phase detector 11.

Optionally, this embodiment is based on Embodiment 3 of the phase calibration apparatus according to the present disclosure. Any coupler 16 in the N couplers 16 may be a second coupler. The first phase detector 11 may obtain a signal output by a coupler 16 serving as the first coupler and the second coupler, and use the signal as the reference signal.

Figure 8:
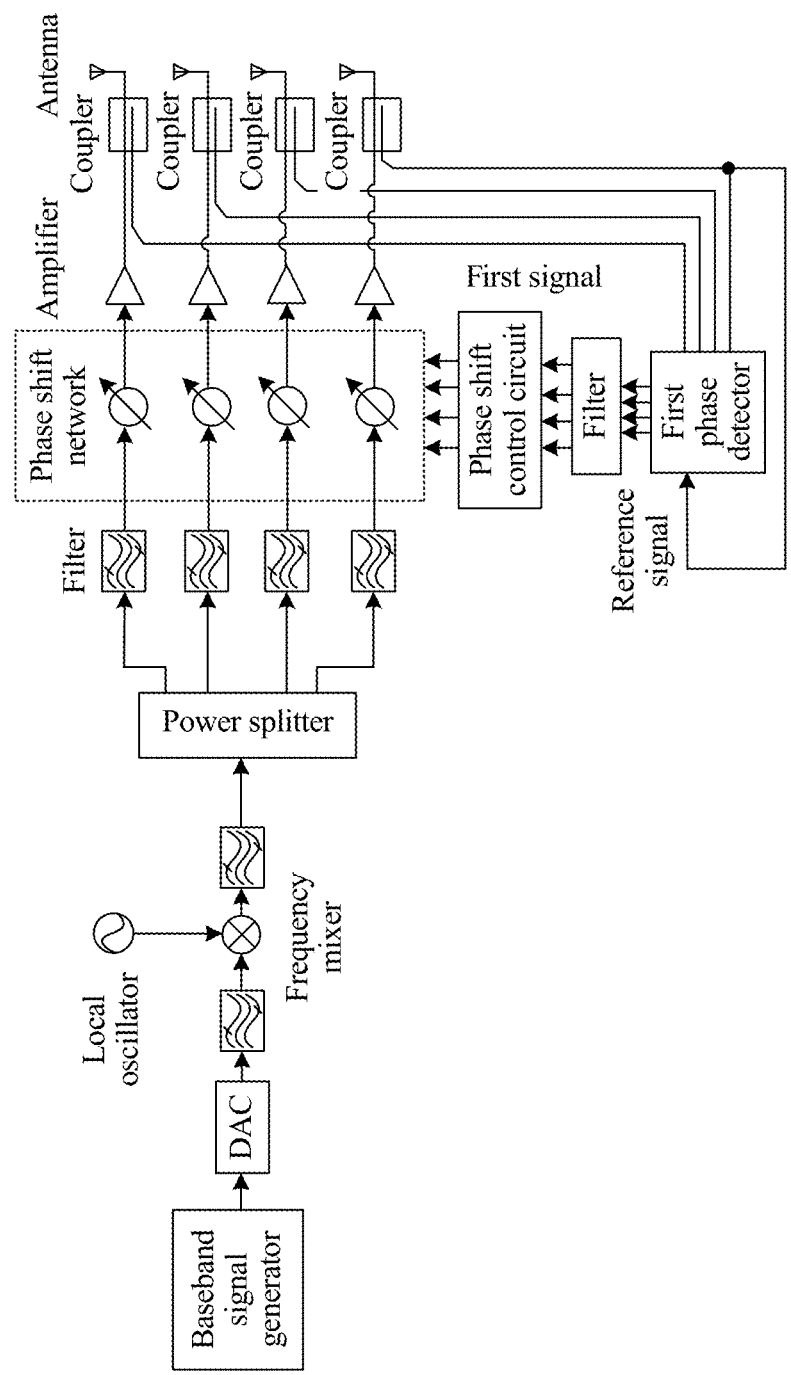
FIG. 8 is a schematic diagram of the phase calibration apparatus according to the present disclosure that is configured to calibrate a phase of a phase shifter on a radio frequency transmit channel and that is shown in FIG. 7.

FIG. 8 is a schematic diagram of the phase calibration apparatus according to the present disclosure that is configured to calibrate a phase of a phase shifter on a radio frequency transmit channel and that is shown in FIG. 7. As shown in FIG. 8, that N is 4 is used for description. The radio frequency transmit channel sequentially includes: a baseband signal generator, a DAC, a filter, a frequency mixer, a local oscillator, a filter, a power splitter, four filters, a phase shift network (that is, four phase shifters), four amplifiers, and four antennas. For example, the first coupler 16 is disposed between the first phase shifter and the first antenna, the second coupler 16 is disposed between the second phase shifter and the second antenna, the third coupler 16 is disposed between the third phase shifter and the third antenna, and the fourth coupler 16 is disposed between the fourth phase shifter and the fourth antenna. The first coupler 16 couples a signal that is phase-shifted by the first phase shifter and that is prior to being transmitted by the first antenna, uses an obtained coupled signal as the first signal that appears first, and outputs the obtained coupled signal to the first phase detector 11; . . . ; and the $N^{th}$ coupler 16 couples a signal that is phase-shifted by the $N^{th}$ phase shifter and that is prior to being transmitted by the $N^{th}$ antenna, uses an obtained coupled signal as the first signal that appears $N^{th}$, and outputs the obtained coupled signal to the first phase detector 11. Optionally, the first coupler 16 is disposed at an input front end of the first antenna and couples an input signal of the first antenna. The second coupler 16 is disposed at an input front end of the second antenna and couples an input signal of the second antenna. The third coupler 16 is disposed at an input front end of the third antenna and couples an input signal of the third antenna. The fourth coupler 16 is disposed at an input front end of the fourth antenna and couples an input signal of the fourth antenna.

Optionally, in this embodiment, the first phase detector 11 may use the coupled signal obtained by the fourth coupler 16 as the first signal and the reference signal.

In another feasible implementation manner, when the phase calibration apparatus in this embodiment is configured to calibrate the N phase shifters on the radio frequency receive channel, the N couplers 16 are N third couplers. The N couplers 16 are disposed between the N phase shifters and the combiner on the radio frequency receive channel on a one-to-one basis. The couplers 16 are configured to couple the signals that are phase-shifted by the phase shifters and that are prior to being combined by the combiner, use obtained coupled signals as the first signals, and output the obtained coupled signals to the first phase detector 11.

Optionally, this embodiment is based on Embodiment 3 of the phase calibration apparatus according to the present disclosure. Any coupler 16 in the N couplers 16 may be used as a fourth coupler. The first phase detector 11 may obtain a signal output by a coupler 16 serving as the third coupler and the fourth coupler, and use the signal as the reference signal.

Figure 9:
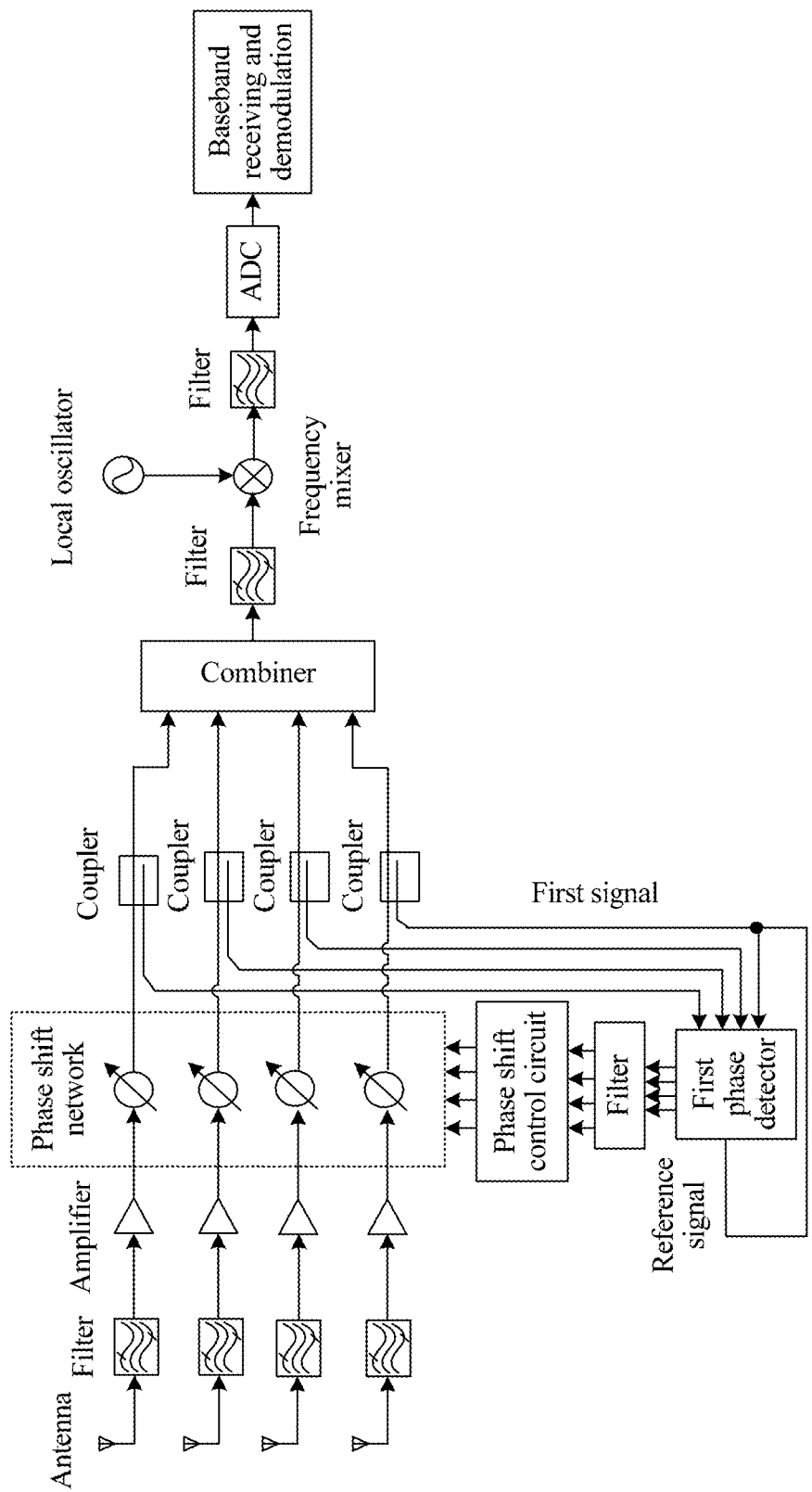
FIG. 9 is a schematic diagram of the phase calibration apparatus according to the present disclosure that is configured to calibrate a phase of a phase shifter on a radio frequency receive channel and that is shown in FIG. 7.

FIG. 9 is a schematic diagram of the phase calibration apparatus according to the present disclosure that is configured to calibrate a phase of a phase shifter on a radio frequency receive channel and that is shown in FIG. 7. As shown in FIG. 9, that N is is used for description. The radio frequency receive channel sequentially includes: four antennas, four first level filters, four amplifiers, a phase shift network (that is, four phase shifters), a combiner, a filter, a frequency mixer, a local oscillator, a filter, an ADC, and baseband demodulator. For example, the first coupler 16 is disposed between the first phase shifter and the combiner, the second coupler 16 is disposed between the second phase shifter and the combiner, the third coupler 16 is disposed between the third phase shifter and the combiner, and the fourth coupler 16 is disposed between the fourth phase shifter and the combiner. The first coupler 16 couples a signal that is phase-shifted by the first phase shifter and that is prior to being combined by the combiner, uses an obtained coupled signal as the first signal that appears first, and outputs the obtained coupled signal to the first phase detector 11; . . . ; and the $N^{th}$ coupler 16 couples a signal that is phase-shifted by the $N^{th}$ phase shifter and that is prior to being combined by the combiner, uses an obtained coupled signal as the first signal that appears $N^{th}$, and outputs the obtained coupled signal to the first phase detector 11. Optionally, the first coupler 16 is disposed at a front end that is of the combiner and that is connected to the first phase shifter, and couples a first input signal of the combiner. The second coupler 16 is disposed at a front end that is of the combiner and that is connected to the second phase shifter, and couples a second input signal of the combiner. The third coupler 16 is disposed at a front end that is of the combiner and that is connected to the third phase shifter, and couples a third input signal of the combiner. The fourth coupler 16 is disposed at a front end that is of the combiner and that is connected to the fourth phase shifter, and couples a fourth input signal of the combiner.

Optionally, in this embodiment, the first phase detector 11 may use the coupled signal obtained by the fourth coupler 16 as the first signal and the reference signal.

In this embodiment, because a calibration phase of each phase shifter is obtained by locking all phases of N first signals phase-shifted by N phase shifters into a phase of a reference signal, accuracy of an obtained initial phase calibration value of each phase shifter is improved without requiring a feedback channel or being affected by channel interference.

Figure 10:
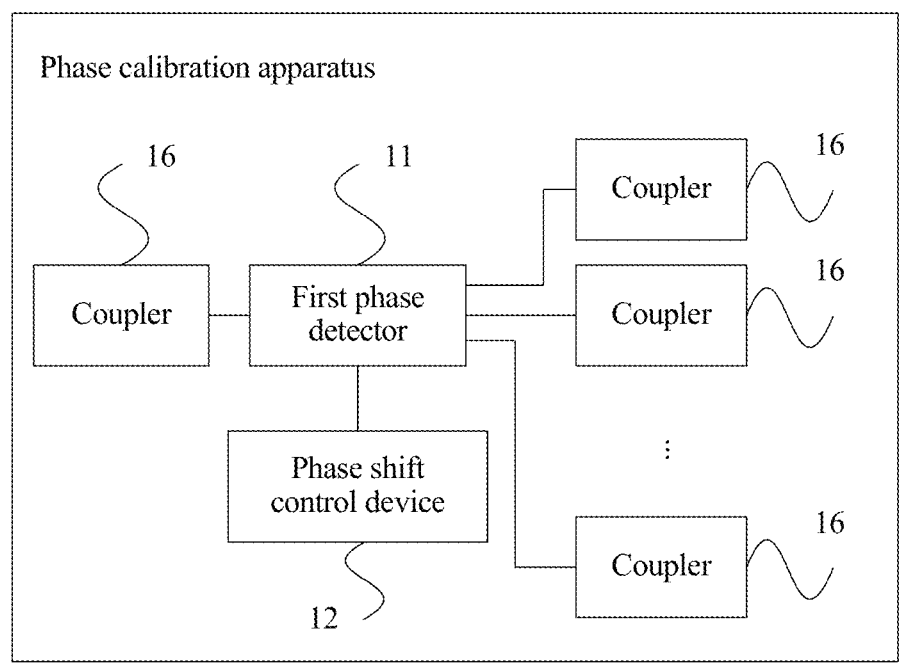
FIG. 10 is a schematic structural diagram of Embodiment 6 of a phase calibration apparatus according to the present disclosure.

FIG. 10 is a schematic structural diagram of Embodiment 6 of a phase calibration apparatus according to the present disclosure. As shown in FIG. 10, the phase calibration apparatus in this embodiment is based on a structure of the apparatus shown in FIG. 7. Further, in addition to including the N couplers 16, the phase calibration apparatus in this embodiment may further include one coupler 16. That is, the phase calibration apparatus in this embodiment may include N+1 couplers 16. The added coupler 16 is connected to the first phase detector 11.

In a feasible implementation manner, when the phase calibration apparatus in this embodiment is configured to calibrate the N phase shifters on the radio frequency transmit channel, the added coupler 16 is the second coupler, and the added coupler 16 may be disposed between the frequency mixer and the first antenna that are on the radio frequency transmit channel. The first antenna is any one of the N antennas connected to the N phase shifters on a one-to-one basis on the radio frequency transmit channel. The added coupler 16 is configured to couple the signals that are mixed by the frequency mixer and that are prior to being transmitted by the first antenna, use obtained coupled signals as the reference signal, and output the obtained coupled signals to the first phase detector 11.

Figure 11:
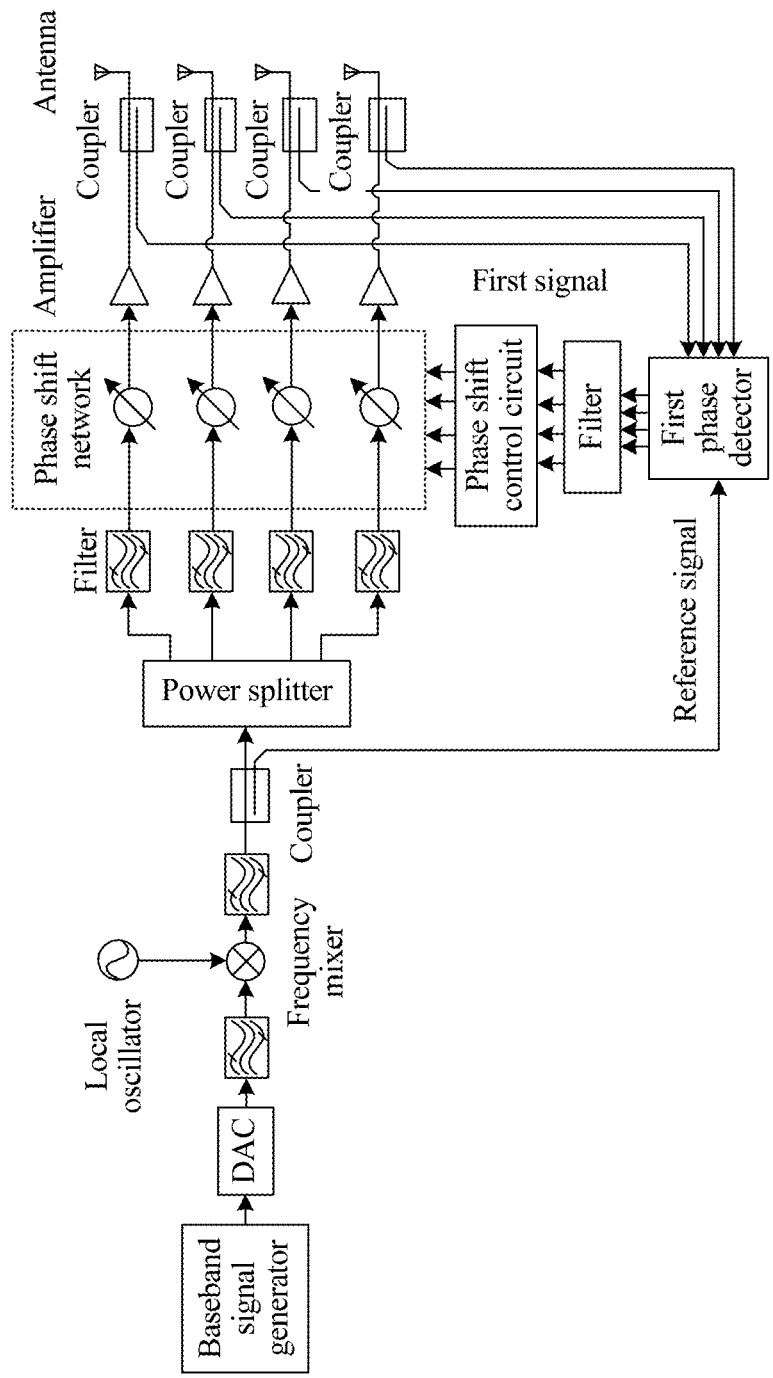
FIG. 11 is a first schematic diagram of the phase calibration apparatus that is configured to calibrate a phase of a phase shifter on a radio frequency transmit channel and that is shown in FIG. 10.
Figure 12:
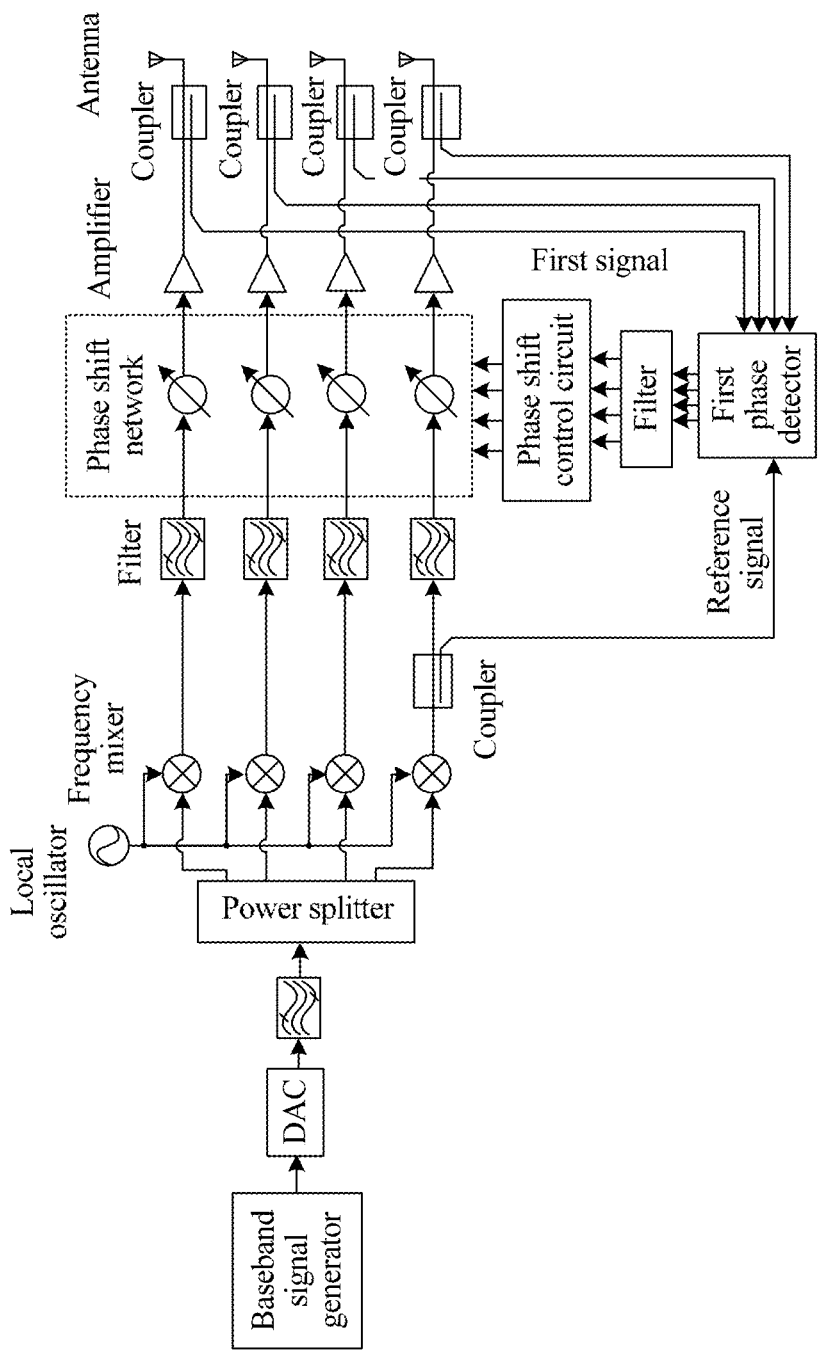
FIG. 12 is a second schematic diagram of the phase calibration apparatus that is configured to calibrate a phase of a phase shifter on a radio frequency transmit channel and that is shown in FIG. 10.

The following uses examples shown in FIG. 11 and FIG. 12 separately to describe the phase calibration apparatus in the present disclosure. FIG. 11 is a first schematic diagram of the phase calibration apparatus that is configured to calibrate a phase of a phase shifter on a radio frequency transmit channel and that is shown in FIG. 10. As shown in FIG. 11, an example in which N is equal to 4 is used. The coupler 16 configured to obtain the second signals serving as the reference signal is disposed preceding a power splitter on the radio frequency transmit channel shown in FIG. 11. That is, the coupler 16 couples an input signal of the power splitter, uses an obtained coupled signal as the reference signal, and outputs the obtained coupled signal to the first phase detector 11.

FIG. 12 is a second schematic diagram of the phase calibration apparatus that is configured to calibrate a phase of a phase shifter on a radio frequency transmit channel and that is shown in FIG. 10. As shown in FIG. 12, an example in which N is equal to 4 is used. The radio frequency transmit channel sequentially includes: a baseband signal generator, a DAC, a filter, a power splitter, four frequency mixers, a local oscillator, four filters, a phase shift network (that is, four phase shifters), four amplifiers, and four antennas. The coupler 16 configured to obtain the second signals serving as the reference signal is disposed between the frequency mixers and the phase shifters that are on the radio frequency transmit channel. The coupler 16 may be disposed following the fourth frequency mixer. Specifically, the coupler 16 couples a signal output by the frequency mixer, uses an obtained coupled signal as the reference signal, and outputs the obtained coupled signal to the first phase detector 11.

In another feasible implementation manner, when the phase calibration apparatus in this embodiment is configured to calibrate the N phase shifters on the radio frequency receive channel, the added coupler 16 is the fourth coupler, and the added coupler 16 may be disposed between the first level filter and the frequency mixer that are on the radio frequency receive channel. The added coupler 16 is configured to couple the signals that are received by the second antenna on the radio frequency receive channel, that are filtered by the first level filter, and that are prior to being mixed by the frequency mixer, use obtained coupled signals as the reference signal, and output the obtained coupled signals to the first phase detector 11. The second antenna is any one of the N antennas connected to the N phase shifters on a one-to-one basis on the radio frequency receive channel.

Figure 13:
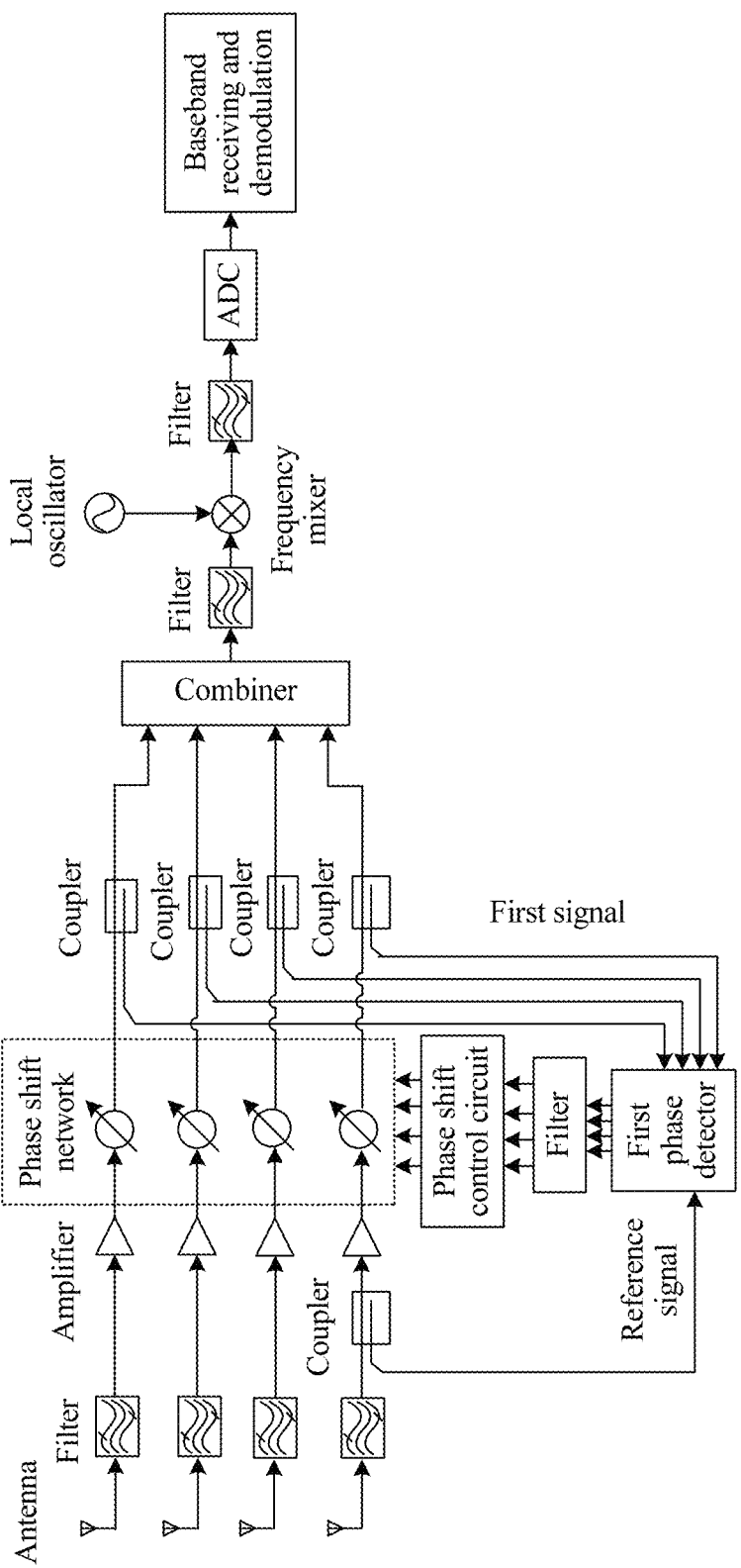
FIG. 13 is a schematic diagram of the phase calibration apparatus that is configured to calibrate a phase of a phase shifter on a radio frequency receive channel and that is shown in FIG. 10.

The following uses an example shown in FIG. 13 to describe the phase calibration apparatus in the present disclosure. FIG. 13 is a schematic diagram of the phase calibration apparatus that is configured to calibrate a phase of a phase shifter on a radio frequency receive channel and that is shown in FIG. 10. As shown in FIG. 13, an example in which N is equal to 4 is used. The coupler 16 configured to obtain the second signals serving as the reference signal is disposed between the filters and the phase shifters that are on the radio frequency receive channel shown in FIG. 13. The coupler 16 is disposed following the fourth filter, couples an output signal of the filter, uses an obtained coupled signal as the reference signal, and outputs the obtained coupled signal to the first phase detector 11.

In this embodiment, because a calibration phase of each phase shifter is obtained by locking all phases of N first signals phase-shifted by N phase shifters into a phase of a reference signal, accuracy of an obtained initial phase calibration value of each phase shifter is improved without requiring a feedback channel or being affected by channel interference.

Figure 14:
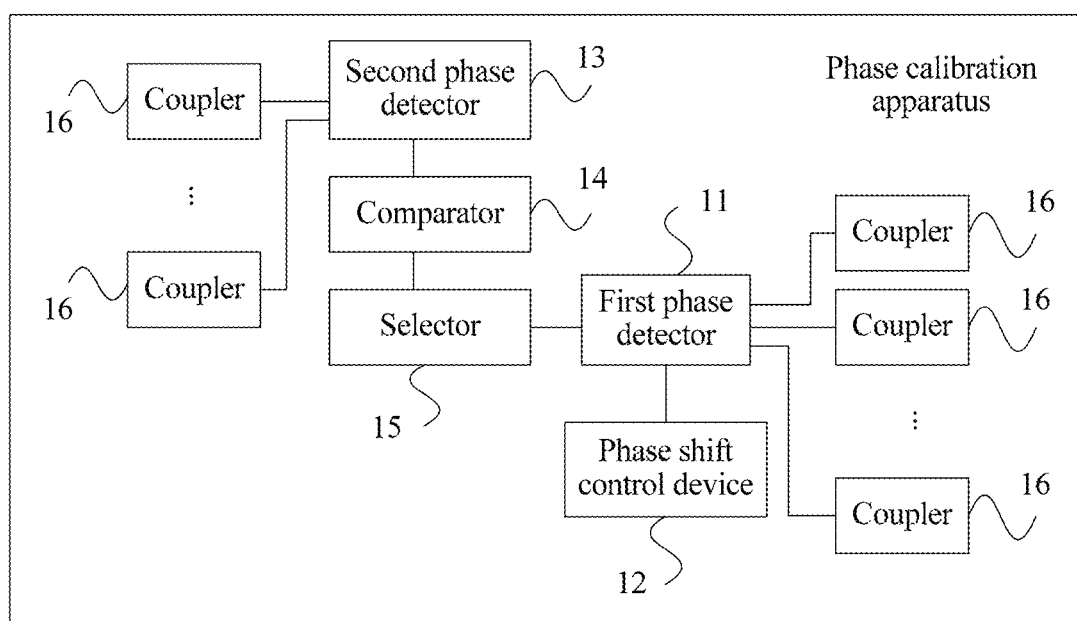
FIG. 14 is a schematic structural diagram of Embodiment 7 of a phase calibration apparatus according to the present disclosure.

FIG. 14 is a schematic structural diagram of Embodiment 7 of a phase calibration apparatus according to the present disclosure. As shown in FIG. 14, the phase calibration apparatus in this embodiment is based on a structure of the apparatus shown in FIG. 7. Further, in addition to including the N couplers 16, the phase calibration apparatus in this embodiment may further include M couplers 16, where M is an integer greater than or equal to 2. That is, the phase calibration apparatus in this embodiment may include N+M couplers 16. The phase calibration apparatus shown in FIG. 14 further includes the second phase detector 13, the comparator 14, and the selector 15 that are shown in FIG. 5. The added M couplers 16 are connected to the second phase detector 13 and the selector 15.

In a feasible implementation manner, when the phase calibration apparatus in this embodiment is configured to calibrate the N phase shifters on the radio frequency transmit channel, the added M couplers 16 are M second couplers. The added M couplers may be separately disposed between the frequency mixer and the first antenna that are on the radio frequency transmit channel. The first antenna is any-one of the N antennas connected to the N phase shifters on a one-to-one basis on the radio frequency transmit channel. The added couplers are configured to couple the signals that are mixed by the frequency mixer and that are prior to being transmitted by the first antenna, use obtained coupled signals as the reference signal, and output the obtained coupled signals to the second phase detector 13 and the selector 15.

Figure 15:
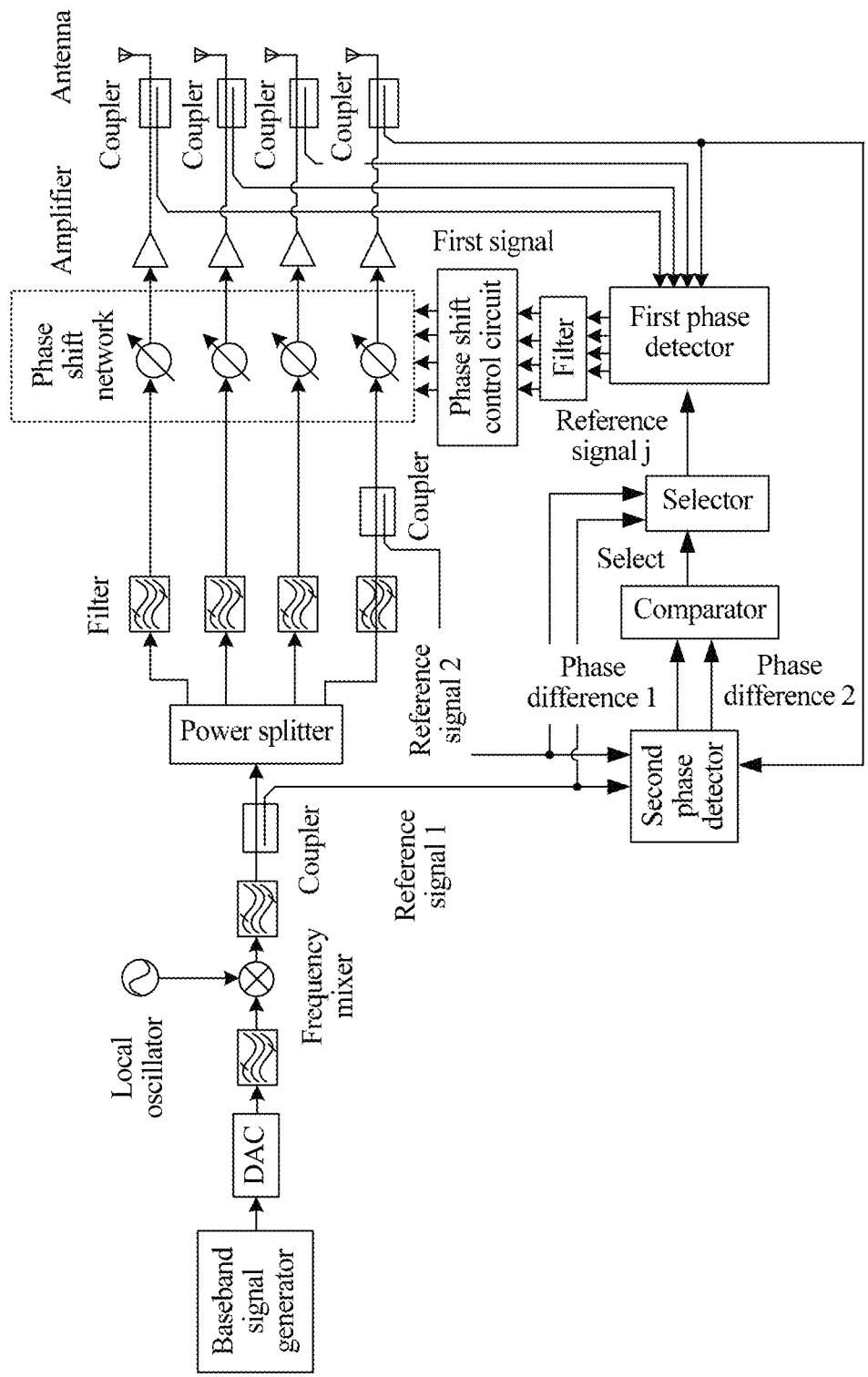
FIG. 15 is a schematic diagram of the phase calibration apparatus that is configured to calibrate a phase of a phase shifter on a radio frequency transmit channel and that is shown in FIG. 14.

The following uses an example shown in FIG. 15 to describe the phase calibration apparatus in the present disclosure. FIG. 15 is a schematic diagram of the phase calibration apparatus that is configured to calibrate a phase of a phase shifter on a radio frequency transmit channel and that is shown in FIG. 14. As shown in FIG. 15, an example in which N is equal to 4 and M is equal to 2 is used. That is, the phase calibration apparatus shown in FIG. 15 includes: four couplers serving as the first couplers, the first phase detector, the second phase detector, the phase shift control device, the filter, the comparator, the selector, and two couplers serving as the second couplers. As shown in FIG. 15, one coupler 16 in the two couplers 16 serving as the second couplers is disposed preceding a power splitter on the radio frequency transmit channel. That is, the coupler 16 couples an input signal of the power splitter, uses an obtained coupled signal as a second signal, where the second signal is a reference signal 1 shown in FIG. 15, and outputs the obtained coupled signal to the second phase detector 13 and the selector 15. The other coupler 16 in the two couplers 16 serving as the second couplers is disposed preceding the fourth phase shifter on the radio frequency transmit channel. The coupler 16 couples an input signal of the phase shifter, uses an obtained coupled signal as a second signal, where the second signal is a reference signal 2 shown in FIG. 15, and outputs the obtained coupled signal to the second phase detector 13 and the selector 15. In addition, the fourth coupler in the four couplers serving as the first couplers outputs a signal (that is, a first signal) obtained by means of coupling to the second phase detector 13. Then the second phase detector 13 obtains a phase difference 1 between the reference signal 1 and the first signal, and a phase difference 2 between the reference signal 2 and the first signal, and outputs the phase difference 1 and the phase difference 2 to the comparator 14. The comparator compares an absolute value of the phase difference 1 with an absolute value of the phase difference 2, determines a smallest absolute value from the two absolute values, and outputs, to the selector 15, a result indicating which reference signal is used to obtain the smallest absolute value. The selector 15 outputs a reference signal j in the reference signal 1 and the reference signal 2 to the first phase detector 11 according to the result, where the reference signal j is the reference signal 1 or the reference signal 2.

In another feasible implementation manner, when the phase calibration apparatus in this embodiment is configured to calibrate the N phase shifters on the radio frequency receive channel. The added M couplers 16 are M fourth couplers. The added M couplers may be separately disposed between the first level filter and the frequency mixer that are on the radio frequency receive channel. The added couplers are configured to couple the signals that are received by the second antenna, that are filtered by the first level filter, and that are prior to being mixed by the frequency mixer, use obtained coupled signals as the second signals, and output the obtained coupled signals to the second phase detector 13 and the selector 15. The second antenna is any one of the N antennas connected to the N phase shifters on a one-to-one basis on the radio frequency receive channel.

Figure 16:
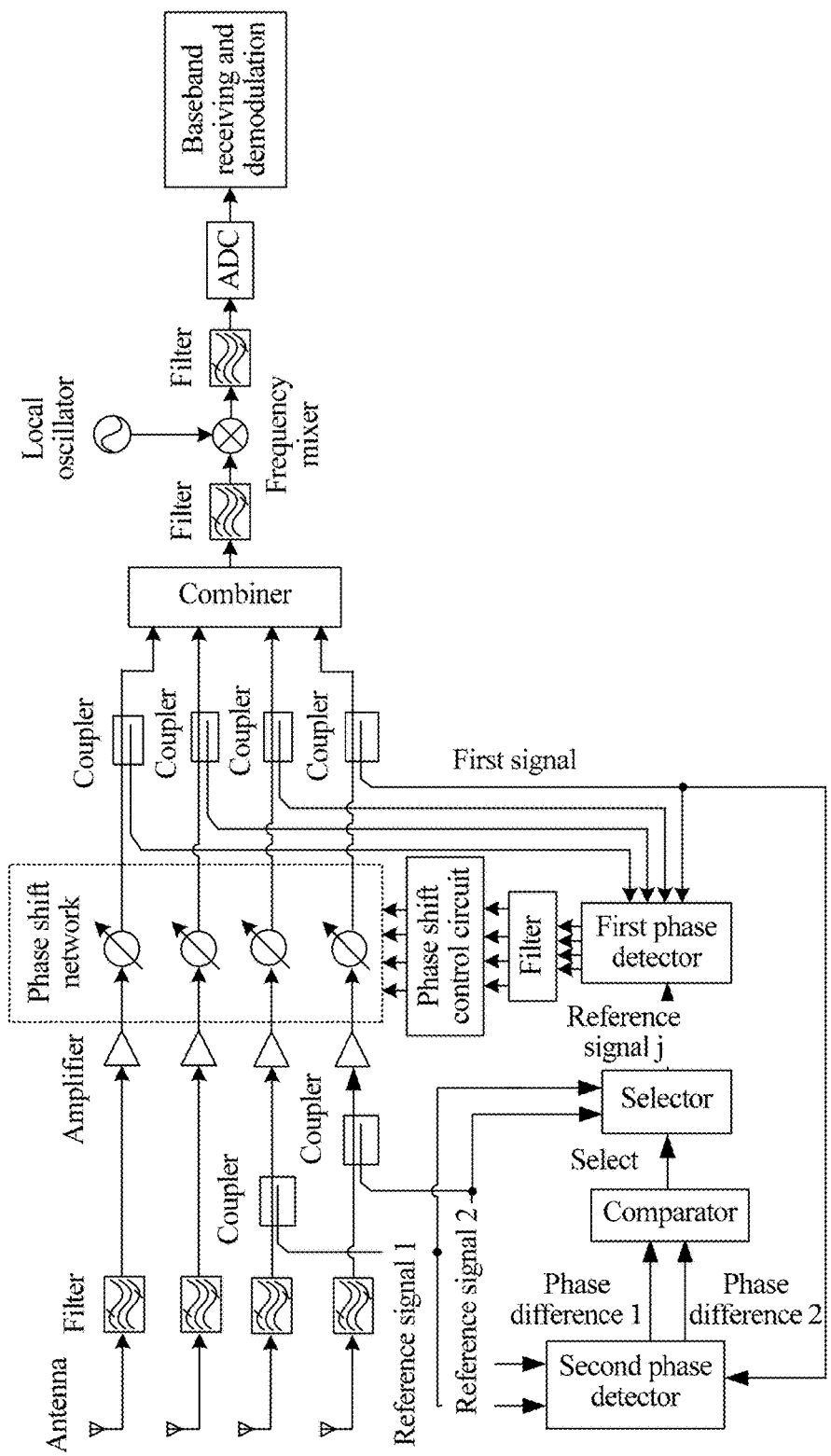
FIG. 16 is a schematic diagram of the phase calibration apparatus that is configured to calibrate a phase of a phase shifter on a radio frequency receive channel and that is shown in FIG. 14.

The following uses an example shown in FIG. 16 to describe the phase calibration apparatus in the present disclosure. FIG. 16 is a schematic diagram of the phase calibration apparatus that is configured to calibrate a phase of a phase shifter on a radio frequency receive channel and that is shown in FIG. 14. As shown in FIG. 16, an example in which N is equal to 4 and M is equal to 2 is used. That is, the phase calibration apparatus shown in FIG. 16 includes: four couplers serving as the third couplers, the first phase detector, the second phase detector, the phase shift control device, the filter, the comparator, the selector, and two couplers serving as the fourth couplers. As shown in FIG. 16, one coupler in the two couplers 16 serving as the fourth couplers is disposed following the third first level filter on the radio frequency receive channel, couples an output signal of the first level filter, uses an obtained coupled signal as a second signal, where the second signal is a reference signal 1 shown in FIG. 16, and outputs the obtained coupled signal to the second phase detector 13 and the selector 15. The other coupler in the two couplers 16 serving as the fourth couplers is disposed following the fourth first level filter on the radio frequency receive channel, couples an output signal of the first level filter, uses an obtained coupled signal as a second signal, where the second signal is a reference signal 2 shown in FIG. 16, and outputs the obtained coupled signal to the second phase detector 13 and the selector 15. Specific subsequent execution processes of the second phase detector 13, the comparator 14, and the selector 15 are the same as specific execution processes of the second phase detector 13, the comparator 14, and the selector 15 in FIG. 15, and details are not described herein.

In this embodiment, a second signal having a smallest phase difference from a first signal in N first signals is used as a reference signal. In this way, calibration of an initial phase of each radio frequency channel can be implemented more rapidly.

Figure 17:
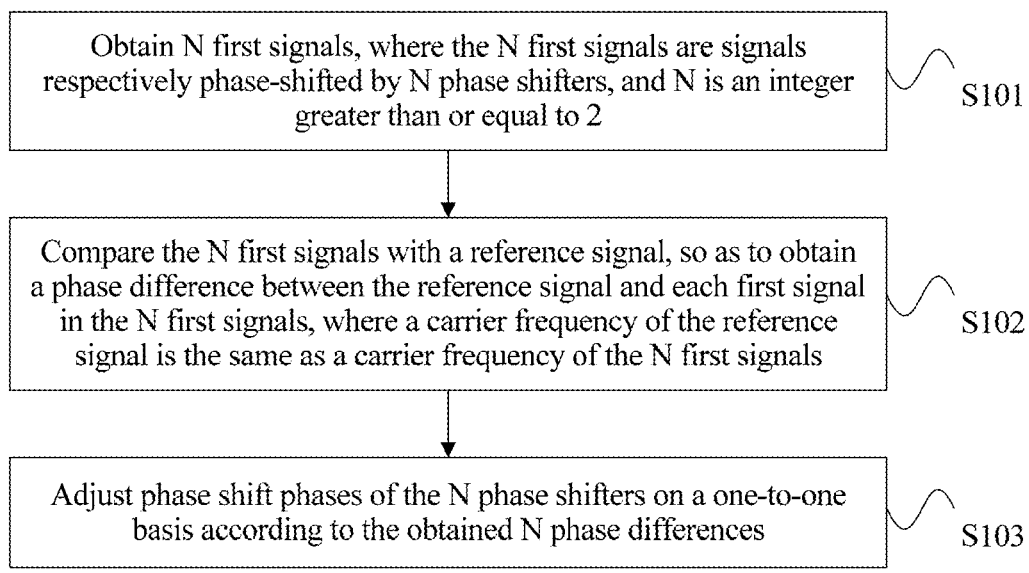
FIG. 17 is a flowchart of Embodiment 1 of a phase calibration method according to the present disclosure.

FIG. 17 is a flowchart of Embodiment 1 of a phase calibration method according to the present disclosure. As shown in FIG. 17, the method in this embodiment may include:

S101. Obtain N first signals, where the N first signals are signals respectively phase-shifted by N phase shifters, and N is an integer greater than or equal to 2.

S102. Compare the N first signals with a reference signal, so as to obtain a phase difference between the reference signal and each first signal in the N first signals, where a carrier frequency of the reference signal is the same as a carrier frequency of the N first signals.

S103. Adjust phase shift of the N phase shifters on a one-to-one basis according to the obtained N phase differences.

Optionally, in a first feasible implementation manner, before the comparing the N first signals with a reference signal, so as to obtain a phase difference between the reference signal and each first signal in the N first signals, the method further includes: obtaining a second signal, and using the second signal as the reference signal.

In a second feasible implementation manner, the method further includes: obtaining M second signals, where M is an integer greater than or equal to 2; separately comparing the M second signals with a first signal in the N first signals, so as to obtain a phase difference between the first signal and each second signal in the M second signals, where phase differences of all the second signals are different; determining a second signal used to obtain a phase difference whose absolute value is smallest in the M phase differences; and using the second signal as the reference signal.

Optionally, in a feasible implementation manner, the N phase shifters are phase shifters on a radio frequency transmit channel, and the first signals are signals that are phase-shifted by the phase shifters and that are prior to being transmitted by antennas connected to the phase shifters on the radio frequency transmit channel.

Optionally, the first signals are coupled signals of the signals that are phase-shifted by the phase shifters and that are prior to being transmitted by the antennas.

Optionally, the first signals are input signals of the antennas.

Optionally, the second signals are signals that are mixed by a frequency mixer on the radio frequency transmit channel and that are prior to being transmitted by a first antenna on the radio frequency transmit channel; or the second signals are output signals of a local oscillator on the radio frequency transmit channel; where the first antenna is any one of the N antennas connected to the N phase shifters on a one-to-one basis on the radio frequency transmit channel.

Optionally, the second signals are coupled signals of the signals that are mixed by the frequency mixer and that are prior to being transmitted by the first antenna.

In another feasible implementation manner, the N phase shifters are phase shifters on a radio frequency receive channel, and the first signals are signals that are phase-shifted by the phase shifters and that are prior to being combined by a combiner on the radio frequency receive channel.

Optionally, the first signals are coupled signals of the signals that are phase-shifted by the phase shifters and that are prior to being combined by the combiner.

Optionally, the N first signals are N input signals of the combiner.

Optionally, the second signals are signals that are received by a second antenna on the radio frequency receive channel, that are filtered by a first level filter connected to the second antenna, and that are prior to being mixed by a frequency mixer on the radio frequency receive channel; or the second signals are output signals of a local oscillator on the radio frequency receive channel. The second antenna is any one of N antennas connected to the N phase shifters on a one-to-one basis on the radio frequency receive channel.

Optionally, the second signals are coupled signals of the signals that are received by the second antenna, that are filtered by the first level filter, and that are prior to being mixed by the frequency mixer.

Based on the foregoing implementation manners, optionally, after the comparing the N first signals with a reference signal, so as to obtain a phase difference between the reference signal and each first signal in the N first signals, the method further includes: performing smooth filtering processing on the phase difference between the reference signal and each first signal in the N first signals, so as to obtain N phase differences on which the filtering processing is performed.

The adjusting phase shift of the N phase shifters on a one-to-one basis according to the obtained N phase differences includes: adjusting the phase shift of the N phase shifters on a one-to-one basis according to the N phase differences on which the filtering processing is performed.

Optionally, the adjusting phase shift of the N phase shifters on a one-to-one basis according to the obtained N phase differences includes:

determining, according to the N phase differences and a correspondence between a phase difference and a phase shifter configuration parameter, N phase shifter configuration parameters corresponding to the N phase differences on a one-to-one basis; and outputting the N phase shifter configuration parameters to the N phase shifters on a one-to-one basis, so that the N phase shifters perform phase shift configuration according to the N phase shifter configuration parameters.

The technical solution shown in this embodiment may be executed by the phase calibration apparatus provided in the foregoing embodiments of the present disclosure. Implementation principles and technical effects that are of the phase calibration apparatus are similar, and for details, refer to the records of the foregoing embodiments, which are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A phase calibration apparatus, comprising:
a first phase detector configured to:
obtain N first signals, wherein N is an integer greater than or equal to 2, and the N first signals are signals respectively phase-shifted by N phase shifters,
compare the N first signals with a reference signal, to obtain a phase difference between the reference signal and each first signal in the N first signals, wherein a carrier frequency of the reference signal is the same as a carrier frequency of the N first signals, and
output N phase differences;
a second phase detector configured to:
obtain M second signals, wherein M is an integer greater than or equal to 2, and all the M second signals have different phases,
separately compare the M second signals with a first signal in the N first signals to obtain a phase difference between the first signal and each second signal in the M second signals, and
output M phase differences;
a comparator connected to the second phase detector and configured to:
receive the output M phase differences,
determine a second signal used to obtain a phase difference whose absolute value is smallest in the M phase differences, and
output a result of the determining;
a selector, connected to the first phase detector and the comparator, configured to:
obtain the M second signals,
use, according to the result of the determining, the second signal determined by the comparator as the reference signal, and
output the second signal to the first phase detector; and
a phase shift controller connected to the first phase detector and configured to receive the N phase differences and adjust phase shift of the N phase shifters on a one-to-one basis according to the N phase differences.

2. The apparatus according to claim 1, wherein the N phase shifters are phase shifters on a radio frequency transmit channel, and the first signals are signals that are phase-shifted by the phase shifters prior to being transmitted by antennas connected to the phase shifters on the radio frequency transmit channel.

3. The apparatus according to claim 2, further comprising:
N first couplers, disposed between the N phase shifters and N antennas on a one-to-one basis and connected to the first phase detector, configured to:
couple the signals that are phase-shifted by the phase shifters prior to being transmitted by the antennas;
use obtained coupled signals as the first signals; and
output the obtained coupled signals to the first phase detector.

4. The apparatus according to claim 2, wherein:
the second signals are signals that are mixed by a frequency mixer on the radio frequency transmit channel prior to being transmitted by a first antenna on the radio frequency transmit channel, or the second signals are output signals of a local oscillator on the radio frequency transmit channel, and wherein the first antenna is any one of the N antennas connected to the N phase shifters on a one-to-one basis on the radio frequency transmit channel.

5. The apparatus according to claim 1, wherein the N phase shifters are phase shifters on a radio frequency receive channel, and the first signals are signals that are phase-shifted by the phase shifters prior to being combined by a combiner on the radio frequency receive channel.

6. The apparatus according to claim 5, further comprising:
N third couplers, disposed between the N phase shifters and the combiner on a one-to-one basis and connected to the first phase detector, configured to:
couple the signals that are phase-shifted by the phase shifters prior to being combined by the combiner,
use obtained coupled signals as the first signals, and
output the obtained coupled signals to the first phase detector.

7. The apparatus according to claim 5, wherein the second signals are signals that are received by a second antenna on the radio frequency receive channel and filtered by a first level filter connected to the second antenna prior to being mixed by a frequency mixer on the radio frequency receive channel, or the second signals are output signals of a local oscillator on the radio frequency receive channel, and wherein the second antenna is any one of N antennas connected to the N phase shifters on a one-to-one basis on the radio frequency receive channel.

8. The apparatus according to claim 1, wherein the phase shift controller comprises:
a filter separately connected to the first phase detector and configured to:
perform smooth filtering processing on the phase difference between each first signal in the N first signals and the reference signal, to obtain N phase differences on which the filtering processing is performed, and
output the N phase differences on which the filtering processing is performed;
and
a phase shift control circuit, connected to the filter and the N phase shifters, configured to:
receive the N phase differences output from the filter, and adjust the phase shift of the N phase shifters on a one-to-one basis according to the received N phase differences.

9. The apparatus according to claim 8, wherein the phase shift control circuit is further configured to:
store a correspondence between a phase difference and a phase shifter configuration parameter; and
determine, according to the N phase differences and the correspondence between the phase difference and the phase shifter configuration parameter, N phase shifter configuration parameters corresponding to the N phase differences on a one-to-one basis, and output the N phase shifter configuration parameters to the N phase shifters on a one-to-one basis, so that the N phase shifters perform phase shift configuration according to the N phase shifter configuration parameters.

10. A phase calibration method, comprising:
obtaining N first signals, wherein the N first signals are signals respectively phase-shifted by N phase shifters, and N is an integer greater than or equal to 2;
obtaining M second signals;
when M is equal to 1, using the M second signal as a reference signal;
when M is greater than or equal to 2, separately comparing the M second signals with a first signal in the N first signals to obtain M phase differences between the first signal and each second signal in the M second signals, wherein the M phase differences of all the second signals are different, determining a second signal used to obtain a phase difference whose absolute value is smallest in the M phase differences, and using the second signal as the reference signal;
comparing the N first signals with the reference signal to obtain N phase differences between the reference signal and each first signal in the N first signals, wherein a carrier frequency of the reference signal is the same as a carrier frequency of the N first signals; and
adjusting phase shift of the N phase shifters on a one-to-one basis according to the obtained N phase differences.

11. The method according to claim 10, wherein the N phase shifters are phase shifters on a radio frequency transmit channel, and the first signals are signals that are phase-shifted by the phase shifters prior to being transmitted by antennas connected to the phase shifters on the radio frequency transmit channel.

12. The method according to claim 11, wherein the first signals are coupled signals of the signals that are phase-shifted by the phase shifters prior to being transmitted by the antennas.

13. The method according to claim 10, wherein the N phase shifters are phase shifters on a radio frequency receive channel, and the first signals are signals that are phase-shifted by the phase shifters prior to being combined by a combiner on the radio frequency receive channel.

14. The method according to claim 13, wherein the first signals are coupled signals of the signals that are phase-shifted by the phase shifters prior to being combined by the combiner.

15. The method according to claim 10, wherein:
after comparing the N first signals with the reference signal to obtain N phase differences between the reference signal and each first signal in the N first signals, the method further comprises:
performing smooth filtering processing on the N phase differences between the reference signal and each first signal in the N first signals to obtain N phase differences on which the filtering processing is performed; and
adjusting phase shift of the N phase shifters on a one-to-one basis according to the obtained N phase differences comprises:
adjusting the phase shift of the N phase shifters on a one-to-one basis according to the N phase differences on which the filtering processing is performed.

16. The method according to claim 10, wherein adjusting phase shift of the N phase shifters on a one-to-one basis according to the obtained N phase differences comprises:
determining, according to the N phase differences and a correspondence between a phase difference and a phase shifter configuration parameter, N phase shifter configuration parameters corresponding to the N phase differences on a one-to-one basis; and
outputting the N phase shifter configuration parameters to the N phase shifters on a one-to-one basis, so that the N phase shifters perform phase shift configuration according to the N phase shifter configuration parameters.

17. A phase calibration apparatus, comprising:
a first phase detector configured to:
obtain N first signals, wherein N is an integer greater than or equal to 2, and the N first signals are signals respectively phase-shifted by N phase shifters,
compare the N first signals with a reference signal, to obtain a phase difference between the reference signal and each first signal in the N first signals, wherein a carrier frequency of the reference signal is the same as a carrier frequency of the N first signals, and
output N phase differences, and
obtain a second signal and use the second signal as the reference signal;
a phase shift controller connected to the first phase detector and configured to receive the N phase differences and adjust phase shift of the N phase shifters on a one-to-one basis according to the N phase differences; and
wherein the N phase shifters are phase shifters on a radio frequency transmit channel, and the first signals are signals that are phase-shifted by the phase shifters prior to being transmitted by antennas connected to the phase shifters on the radio frequency transmit channel.

18. The apparatus according to claim 17, further comprising:
N first couplers, disposed between the N phase shifters and N antennas on a one-to-one basis and connected to the first phase detector, configured to:
couple the signals that are phase-shifted by the phase shifters prior to being transmitted by the antennas;
use obtained coupled signals as the first signals; and
output the obtained coupled signals to the first phase detector.

19. The apparatus according to claim 17, wherein:
the second signals are signals that are mixed by a frequency mixer on the radio frequency transmit channel prior to being transmitted by a first antenna on the radio frequency transmit channel, or the second signals are output signals of a local oscillator on the radio frequency transmit channel, and wherein the first antenna is any one of the N antennas connected to the N phase shifters on a one-to-one basis on the radio frequency transmit channel.

20. A phase calibration apparatus, comprising:
a first phase detector configured to:
- obtain N first signals, wherein N is an integer greater than or equal to 2, and the N first signals are signals respectively phase-shifted by N phase shifters,
- compare the N first signals with a reference signal, to obtain a phase difference between the reference signal and each first signal in the N first signals, wherein a carrier frequency of the reference signal is the same as a carrier frequency of the N first signals, output N phase differences, and
- obtain a second signal and use the second signal as the reference signal;

a phase shift controller connected to the first phase detector and configured to receive the N phase differences and adjust phase shift of the N phase shifters on a one-to-one basis according to the N phase differences; and wherein the N phase shifters are phase shifters on a radio frequency receive channel, and the first signals are signals that are phase-shifted by the phase shifters prior to being combined by a combiner on the radio frequency receive channel.

21. The apparatus according to claim 20, further comprising:

N third couplers, disposed between the N phase shifters and the combiner on a one-to-one basis and connected to the first phase detector, configured to:
- couple the signals that are phase-shifted by the phase shifters prior to being combined by the combiner,
- use obtained coupled signals as the first signals, and
- output the obtained coupled signals to the first phase detector.

* * * * *